United States Patent
Kofoed (12) 
(10) Patent No.: US 6,711,458 B1
(45) Date of Patent: Mar. 23, 2004

(54) HANDLING SYSTEM AND INDICATION SYSTEM FOR SAME

(75) Inventor: Ralph Kofoed, Hornslet (DK)

(73) Assignee: Apport Systems A/S (DK)

( * ) Notice: Subject to any disclaimer, the term of this patent is extended or adjusted under 35 U.S.C. 154(b) by 0 days.

(21) Appl. No.: 10/031,906
(22) PCT Filed: Jul. 19, 2000
(86) PCT No.: PCT/DK00/00412
  § 371 (c)(1),
  (2), (4) Date: Jan. 18, 2002
(87) PCT Pub. No.: WO01/05686
  PCT Pub. Date: Jan. 25, 2001

(30) Foreign Application Priority Data

Jul. 19, 1999 (DK) .......................................... 1999 01036

(51) Int. Cl.[7] ................................................. G06F 7/00
(52) U.S. Cl. ....................................... 700/213; 700/216
(58) Field of Search ................................ 700/213, 225, 700/229, 236, 244, 216; 340/572.1, 572.7, 10.1; 235/385

(56) References Cited

U.S. PATENT DOCUMENTS

| | | | | |
|---|---|---|---|---|
| 5,565,858 A | * | 10/1996 | Guthrie | 340/10.33 |
| 5,805,455 A | * | 9/1998 | Lipps | 700/231 |
| 5,975,416 A | * | 11/1999 | Chow et al. | 235/383 |
| 6,056,199 A | * | 5/2000 | Wiklof et al. | 235/462.45 |
| 6,151,536 A | * | 11/2000 | Arnold et al. | 700/237 |
| 6,166,638 A | * | 12/2000 | Brady et al. | 340/572.7 |
| 6,335,685 B1 | * | 1/2002 | Schrott et al. | 340/572.1 |

* cited by examiner

Primary Examiner—Gene O. Crawford
(74) Attorney, Agent, or Firm—Cantor Colburn LLP (57) ABSTRACT

A system for handling of items constituting a range of items is provided including at least one central control unit, at least one mobile communication unit designed to generate audio and/or visual location signals on the basis of preferably wireless communication signals generated by or the central control units, and at least one return signal path between the communication unit and the central control unit. The items are located in macro zones with at least one underlying hierarchy of elementary zones and each macro zone includes one visual indication system directly or indirectly controlled by the central control unit on the basis of the current location action.

19 Claims, 6 Drawing Sheets

HANDLING SYSTEM AND INDICATION SYSTEM FOR SAME

BACKGROUND OF THE INVENTION

1. Field of the Invention

The present invention relates to a system for manual handling of items constituting a range of items. Furthermore, the invention relates to an indication system, a mobile communication unit and an indication unit.

2. Description of Related Art

An example of a field of application would typically be in relation to large central warehouses where storing and picking typically take place in accordance with fairly primitive guidelines, as a warehouse employee picks one product number at a time from a list, locates the storage position of the product number, and picks the number of products stated in the picking list.

Meanwhile, tests have shown that this picking process is quite time-consuming as the individual warehouse employee spends quite a significant amount of time on locating the individual storage positions in the warehouse. This has prompted the desire to have a system constructed which makes the working process of the warehouse employees easier in such a manner that they spend only a minimum amount of time on locating the various warehouse storage positions.

An example of such a system is known from U.S. Pat. No. 4,792,273 where a storage room is provided with a number of storage positions. The system is designed for manual operation where a number of warehouse employees pick from the storage positions based on order slips. Also, the system has been provided with a number of light indicators at the various storage positions together with light direction indicators. Thus, one light indicator indicates the desired storage position while the light direction indicator guides the warehouse employee from position to position. If the system is to support more than one warehouse employee, each employee must be assigned a particular colour.

One disadvantage of the above-mentioned technique is, among other things, that the system is only capable of supporting a limited number of warehouse employees as each employee must be assigned a new particular colour. Various colour combinations may thus be difficult for the employees to interpret. Apart from that, the hardware construction is quite complicated and will be difficult to implement by large systems since the colour indicators must necessarily be able to guide a particular employee from one given position to another.

EP patent No. 531.645 introduces a mobile headset to be worn by a warehouse employee comprising a micro processor, speakers, a microphone, a display, a wireless modem and an optical bar code scanner. The micro processor transforms orders in terms of names or words provided by the employee into the microphone to machine code and the modem forwards the machine code to a central control unit. The central control unit sends the picking/direction instructions to the headset via the modem, either as audio signals to the speakers or visual signals on the display in the visual area.

One disadvantage of the above-mentioned invention is that the warehouse employee still requires a picking list of goods. Furthermore, the storage positions are not provided with indicators clearly showing the requested location to the warehouse employee at a distance whereby the warehouse employee may experience problems in locating a particular product in quite large warehouses. Another problem with the above-mentioned technique is that a headset of the above-mentioned nature is quite uncomfortable to wear due to its weight.

JP patent No. 7.172.521 introduces a storage control system comprising a central control unit, a mobile wireless communication unit with a bar code scanner, a display and a printer. The central control unit receives the inputs made by the warehouse employee via the communication unit in terms of scanning of the bar code on the individual shelf/rack and compares the received bar code with the stored picking list. The result of the search is subsequently transmitted back to the communication unit and the warehouse employee may read it on the display or in print.

The above-mentioned system does not concern a system guiding the employee to a given product. Thus, time spent on locating a given storage position should be added.

BRIEF SUMMARY OF THE INVENTION

The invention relates to a system for handling of items constituting a range of items The systems comprises at least one central control unit, at least one mobile unit capable of generating audio and/or visual location signals based on preferably wireless communication signals generated by the central control unit(s), the system featuring at least one return signal path between the mobile communication unit and the central control unit. The items are located in macro zones with at least one underlying hierarchy of elementary zones, wherein each macro zone comprises at least one additional visual indication system being directly or indirectly controlled by the central control unit in dependency of a current location handling.

With this system, an efficient and inexpensive handling system has been obtained that may be used for as well location as distribution of items constituting a range of items.

It should be noted that manual picking and distribution also include aiding means for handling purposes such as trolleys, trucks, conveyor belts etc. The important issue is that the individual warehouse employee carries out the decentralized handlings in relation to the elementary zones as opposed to robot systems where human resources are only used to monitor an established distribution system.

The term items include e.g. products in storage such as in wholesale warehouses, spare parts storage facilities, certain types of libraries etc.

A standardized handling process comprises a given syntax for the given desired action and may e.g. include a definition of the item to be handled, information of wherefrom and whereto the handling must be carried out, the number of handled items etc.

A location signal comprises e.g. audio signals that may guide the warehouse employee to the desired elementary zone through the mobile communication unit. The location signals will mainly be provided by the mobile communication unit as a number of processing steps until the final elementary zone is located. An example of such a location process consisting of several pieces of cooperating information to the employee may be a first location signal guiding the employee to a macro zone, after which the employee receives another location signal in terms of e.g. a particular light indication of the elementary zone within the macro zone.

Depending on the range of items, the location process may consist of several cooperating process steps.

A significant advantage of the invention is that intelligence may be sustained centrally between the central unit and the picking or distributing employees provided with the communication units. This makes it possible to carry out relatively complex distribution or picking programs whereby the utilization rate of the total system may be optimized while at the same time avoiding conflicts and misunderstandings between the picking and distributing employees.

Another advantage of the invention is that the system may easily be used reversibly or multi-directionally. Thus, hardware modifications are not required if the system is to be reversed and used for distribution of items to various elementary zones instead of being used for picking purposes.

Combined with the possibilities of individual feedback from the decentralized communication units, central intelligence makes it possible to redefine the system entirely under certain circumstances in relation to e.g. the number of picking employees, changes and adjustments of elementary zones, changes in the range of items etc.

Thus, a significant advantage of the system is that current maintenance may be carried out purely by software operations, irrespective of variations in the number of employees or product numbers.

In that connection, it should be noted that a system according to the invention may be utilized to the maximum in terms of the number of picking employees which may be increased to the limit of what is possible in practice without the picking or distribution process breaking down. Thus, current profitability may be improved significantly when compared to existing systems whereby the statistical utilization rate results in an improvement of profitability.

In addition, the system allows significant dynamic variation in the system load since the number of picking or distribution employees may be varied almost instantaneously. This provides advantageous flexibility in relation to seasonal fluctuations and consequently in relation to the number of picking and distribution employees.

An advantage of dividing the system into macro zones is that the individual macro zones may be located relatively easily by the individual picking employees.

The degree of training required to use a given system naturally depends on the number of macro zones comprised by the system together with the location and the labelling thereof.

However, it is generally preferable that the macro zones are designed in such a manner that the individual employees will be able to locate them easily and quickly on the basis of the provided audio or visual location signal.

Another factor to keep in mind when dimensioning the system is that the number of macro zones should be sufficiently large in relation to the picking system for which it is dimensioned.

Another advantage of the invention is that the macro zones are dynamically defined on the basis of the centrally defined guidelines. The result of this is that not only the elementary zones of the specifically chosen application but all applications may be redefined in relation to the elementary zones and macro zones without hardware modifications. A redefinition of macro zones may thus be carried out by addition or division of existing macro zones whereby adjustments to be made by the employees become the main object to be taken into consideration when redefining macro zones.

Yet another advantage of the invention is that a possible simplification of the system process means that the warehouse employee may in reality be provided with only one instruction at a time in such a manner that the following instruction is not received or visualized until the previous instruction is carried out. This gradual location process is possible because the handling employee has the possibility to transmit a feedback signal back to the control unit at all times so that the control unit always has an updated version of the status of the location process, partly macroscopically in relation to the number of carried out location actions, and partly microscopically in relation to how far ahead each location process is, i.e. whether the warehouse employee has located the macro zone, the item or position of the item, and whether the location action has been carried out. Apart from that, it would be relevant to report back to the central control unit whether the ordered item is actually present in the appropriate elementary zone or whether new items should be restocked. Thus, the central control unit is capable of automatically reporting to the principal that the items in question may possibly be in back order, just as the central control unit may order new items for restocking in an elementary zone from the supplier.

Another advantage of the constant two-way communication of the system is that individual variations in the work situation of the warehouse employees may be adapted to the overall system. For example, visits to the restroom by the employee, lunch breaks etc. may be registered so that these inactive states do not block the macro zones or the entire system as such.

Another consequence of this continuous feedback from warehouse employees is that all location actions may be changed dynamically before they have been initiated whereby central control may ensure that none of the handling employees will have to stand in line at certain macro zones and wait for them to be available.

By using a two-step or a multidirectional location process by which the picking employees may locate macro zones by the first process step and subsequently locate the elementary zone or sub-division thereof by means of a visual indication of one or more elementary zones by the second process step, it is possible to optimize the (limited) learning potential of an employee by combining it with the location process which provides an exact location of a position and thereby a reduction in costs in relation to otherwise required hardware.

Apart from being an inexpensive system in relation to hardware, a system is obtained which is capable of reducing time spent on the location process when compared with other known system. The major critical factor in complex systems, such as storage facilities carrying a wide range of product numbers is the time-factor whereby the individual warehouse employee reads the individual product numbers on a handling list, and the time from which he moves from his actual position to the position where the item is located and handles the given item in accordance with the guidelines.

In practice, a controlled process division according to the invention results in time spent on searching for each location being reduced significantly in relation to time spent on searching in accordance with known systems.

Another advantageous feature of the invention is that complete implementation may be carried out without the use of paper from receipt of an order to the principal receives the ordered goods.

Another advantage of the invention is that the general system principle may be adapted to a wide range of applications such as spare part storage facilities, wholesale warehouses, production equipment, various types of mechanical configuration processes, libraries or even patent offices that are yet to be paperless.

In practice, it is of little significance whether the central control units are stationary or mobile. However, with respect to technical issues, it is important that a general protocol or control coordinates communication between the individual mobile communication units. Whether such control is generally restricted to control of the individual communication units or a more coordinated protocol ensuring that resource consumption is not in conflict, is of little relevance from a technical point of view. However, according to a particular embodiment of the invention, it is preferable that only one central control unit initiates all location actions, supervises these actions and registers the outcome of the carried out actions.

Furthermore, central unit control provides the opportunity of a central operator being able to add location actions to existing and already initiated lists of location actions whereby e.g. last-minute orders may be carried out even though a warehouse employee is already busy with existing actions.

Central control also provides the central operator with the opportunity to place already initiated location lists on standby and initiate other processes such as e.g. a rush order. Other possibilities include letting one or more warehouse employees work on the same location list.

It should be emphasized that all of the above-mentioned features have the particular advantage that the individual warehouse employee never has to register or at least does not need to register changes in the process or to coordinate it with parallel handling processes. Thus, a warehouse employee is only provided with a minimum of information while the central control unit handles canonical structuring of very large amounts of data.

From another perspective, the invention may therefore be regarded as a support system using human qualities irreplaceable by robot technology optimally while the system itself takes over the more complex and immense canonical functions from a human perspective.

By letting the central control unit be designed for storage of a digitally stored handling list comprising a number of standardized actions, and by letting the central control unit feature means for transmission of a signal to initiate a standardized action to one or more specifically addressed mobile communication units on the basis of the handling list stored in the central control unit, a simple control system of a picking or distribution process has been obtained with the above-mentioned advantages.

The control process itself is thus completely controlled by the central control unit and a potential operator.

Another advantage of the present embodiment is that a variation in the range of items may easily be implemented by central programming and storage of a new handling list.

Another advantage of central control, and thereby monitoring of the system, is that the handling process may be disrupted or varied centrally by an operator without breakdowns in logistics.

By letting the system comprise wholly or partially automatic transmission of a new, preferably wireless, signal to initiate a location action upon receipt of a return signal from the warehouse employee, it is possible to obtain easy and quick order control since each of the location actions may be initiated completely automatically once a previous location action is completed. This will reduce the strain on a central operator and thereby provide him with the resources to carry out potential manual operations in a particular picking or distribution process without affecting others in doing so.

By letting the mobile communication unit comprise means to facilitate transmission of the return signals activated by the warehouse employee, a preferred embodiment of the invention is obtained, since the system has thereby centralized intelligence completely around the central processing unit and the applied communication units.

This centralization naturally results in a reduction of resources as the amount of processing equipment is reduced. Also, it makes it possible to carry out software changes of the system since any potential use of manually activated units for rendering of return signals at the individual elementary zones may be minimized or completely avoided.

Thus, construction of a new elementary zone will not require moving or changing of hardware since the required hardware is already implemented in the mobile communication unit.

Another advantage of providing the system with return signal paths controlled by the warehouse employee is that the system may be designed to receive signals at appropriate intervals whereby one or more central control units are provided with a continuous feedback ensuring that all process steps are carried out in a suitable order, just as it is ensured that no conflicting operations are initiated or handling assignments disrupted before completion.

By letting the signal for initiation of a location action comprise or generate instructions to the warehouse employee through the mobile communication unit(s) of a macro zone wherein one or more items must be located, an advantageous embodiment of the invention has been obtained, since each location action is initiated by guiding the warehouse employee to a macro zone wherein the employee may subsequently locate the specific item.

By letting the indication system comprise at least one laser pointer controlled by remote for each macro group, the laser pointer being arranged in such a manner that it may identify the elementary zones of a given macro zone on the basis of control signals provided by the central control unit, an advantageous embodiment of the invention has been obtained. Thus, by applying a laser pointer controlled by remote, it is possible, according to the invention, to divide the directions to the individual picking employees into two levels, namely a first level guiding the employee to the macro zone in which specific item is located and a second level whereby the item may subsequently be visualized directly or indirectly by the picking or distribution employee. This division of location actions into two (or more) levels contributes to a quick and efficient location process which does not pose significant requirements to the individual picking or distribution employee's knowledge of the location of the individual items.

This also means that particular peak load periods may be significantly eased since non-skilled workers may be used to pick and distribute without requiring comprehensive training or retraining. Another advantage is greater flexibility in relation to the work areas of the individual employees since special knowledge of the locations of the items becomes superfluous.

Another advantage of using a laser pointer is that once it has been placed purposefully in a macro zone, it may currently be reprogrammed to the specifically chosen elementary zone and thereby the location of an item. For example, it is sufficient to use a control device of the pointer, e.g. a joy-stick, in order to make the laser pointer identify the new or redefined elementary zone and subsequently have the control coordinates of the pointer registered centrally in the central control unit or decentrally in the control device of the pointer itself.

Readjustment or adding of elementary zones to the system is thus limited to comprising pure calibration measures, making them practically cost-free operations in practice as opposed to the known systems where expansion requires new hardware.

By letting the indication system comprise stationary, and preferably shelf-mounted markers, it is possible to obtain a simple and improved location-independent method indicating the elementary zones of the individual macro zones.

By letting the indication means be activated wholly or partially by the central control unit by transmission of a signal to initiate a location action, an advantageous level of control is obtained as the individual macro zone is automatically ready to receive a picking or distribution employee once a location action has been initiated.

The synchronization of the individual employees may be carried out centrally when desired and on the basis of the known position of the employees, just as the order lists may be automatically modified so that the waiting time at the involved macro zones is avoided or minimized.

By letting the mobile communication units be provided with a code scanner, preferably a bar code scanner, for scanning of an item and/or an elementary zone identification number, and by letting the system be designed to open a macro zone once an addressed mobile unit scans a code with the code scanner after receipt of a macro zone location signal from the central control unit when an elementary zone or item corresponds to that macro zone location signal, it is possible to obtain a system capable of adapting to the requirements of the warehouse employee in such a manner that the user must initiate an action.

The invention also relates to an indication system indicating elementary zones and comprising a number of markers and a control unit, the control unit comprising communication means for receipt and transmission of control signals, the control unit further comprising activation means for activation of the markers. This indication system is unique due to the fact it is constituted by a number of markers and at least one control unit in an indication unit.

In this manner, individual indication units are obtained and the dimensions of the indication system may easily be changed by addition or removal of indication units.

When the indication of one or more elementary zones of the indication system is adjustably controlled by the control unit, a flexible system is achieved, wherein changes, adjustments and redefinitions of the elementary zones may be performed without changes in the hardware of the system. Any position may be appointed as an elementary zone, e.g. a location of an item box or item container having various sizes, by one or more of the available markers, adjustably and flexibly controlled by the control unit.

In a further embodiment, the markers of the indication units are placed in such a manner that they may identify elementary zones with a width of as small as 0.5 cm individually, and in a particular embodiment, the indication units are light-emitting diodes (LEDs).

In this manner, it will be possible to identify items of very small dimensions and in a very dense environment.

In another embodiment, the indication unit is shaped as a rail. In this manner, it may be placed on the front of a shelf or rack and thereby identify elementary zones along this shelf or rack.

In a particular embodiment, the rail has a length, which corresponds to the length of at least one shelf in a rack. Hereby, the rail may be used to identify elementary zones along the entire shelf.

In another embodiment, the markers are uniformly dispersed along the rail. In this manner, they are not limited to only identifying elementary zones of predetermined dimensions.

In yet another embodiment, the communication means of the control unit is capable of communicating wirelessly. In this manner, it is not necessary to set up a network system while it is also easier to expand the identification system.

The invention also relates to a mobile communication unit comprising means for receipt and transmission of wireless communication signals, the communication unit also comprising means for generation of audio signals and/or visual signals on the basis of received signals in order to initiate a location action from a central unit, the communication unit comprising a device for manual activation of a wireless return signal to the central control unit, the return signal indicating that a location action is completed, and the audio signals and/or visual signals being able to identify part of or all macro zones to the employee carrying the communication unit built into a vest or a similar piece of garment or equipment in such a manner that all elements belonging to a unit may be mounted on an employee.

It will be understood that by vest or a similar piece of garment or equipment is in this context meant any appropriate means by which the elements of the communication unit may be carried, suspended or supported on the body and in particular on the torso of the employee. Thus, for example, a regular item of garment may be used or suspension means comprising bands, strips or the like for supporting the equipment may be used as well.

In this manner, the warehouse employee is guided to a macro zone and the mobile unit may be carried for long periods of time as it is comfortable in use. Also, a warehouse employee may have his hands free during the location process.

By letting the unit comprise a display unit for displaying a macro zone, identification of an item and information of number and/or quantity of items to be picked or distributed, a simple and advantageous manner of performing fast and reliable location actions has been achieved.

By letting the communication unit comprise ergonomically correct operation facilities, another advantageous embodiment of the invention has been obtained that may be implemented by featuring the unit with two signing buttons that may provide sufficient feedback to the central control unit during the usual location process.

By letting the communication unit comprise speaker units placed near the shoulders of the employee when carried by him, a particularly advantageous embodiment of the invention has been obtained, as everyday use of the mobile communication unit is made particularly comfortable. This improvement must be seen in the light of the fact that a hearing earpiece and a headset generally emit a quite uncomfortable sound during a work situation.

The invention further relates to an indication unit for indication of elementary zones comprising a number of markers and a control unit, the control unit comprising communication means for receipt and transmission of control signals and activating means for activation of one or more markers.

Hereby is achieved that a handling and/or indication system may be established and/or configured in a flexible, fast and reliable manner using a number of indication units according to the invention. Advantageously the indication units according to the invention may be used in connection with existing warehouse shelves. Further, existing handling systems may easily be changed, enlarged or reconfigured using these indication units, since the unit may easily be removed and/or replaced and since further units may easily be added to the system.

By letting the indication unit be shaped as a rail, an advantageous embodiment has been achieved. In this manner, the indication unit may be placed on the front of a shelf or rack and thereby identify elementary zones along this shelf or rack.

In a particular embodiment, the rail of the indication unit has a length, which corresponds to the length of at least one shelf in a rack. Hereby, the indication unit may be used to identify elementary zones along the entire shelf.

In a further embodiment, the markers of the indication units are placed in such a manner that they may identify elementary zones with a width of as small as 0.5 cm individually, and in a particular embodiment, the markers of the indication units are light-emitting diodes (LEDs).

In another embodiment, the markers are uniformly dispersed along the rail of the indication unit. In this manner, they are not limited to only identifying elementary zones of predetermined dimensions.

In yet another embodiment, the communication means of the control unit is capable of communicating wirelessly. In this manner, it is not necessary to set up a network system while it is also easier to expand the identification system, when using the indication units according to this embodiment of the invention.

BRIEF DESCRIPTION OF THE SEVERAL VIEWS OF THE DRAWINGS

The invention will be described in detail in the following with reference to the drawings, in which.

DETAILED DESCRIPTION OF THE INVENTION

Figure 1:
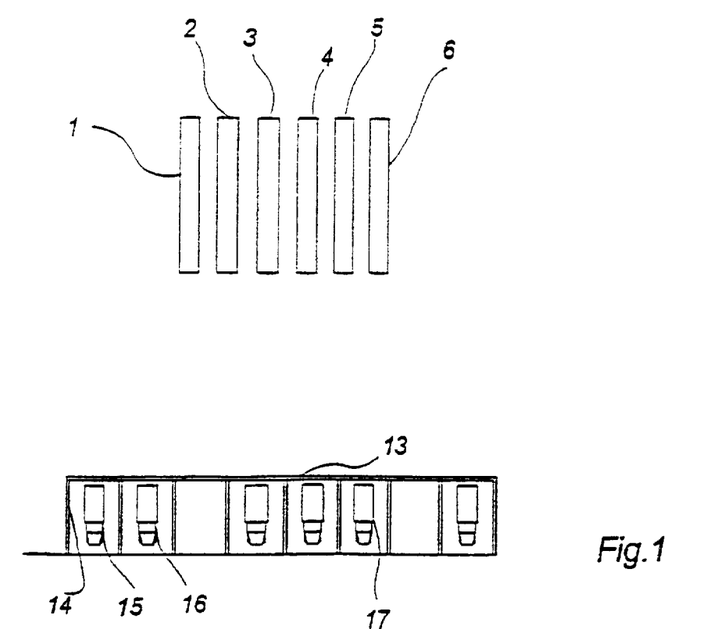
FIG. 1 shows a schematic diagram of a warehouse.

FIG. 1 shows an example of a system, wherein an embodiment of the invention may be advantageously applied. In the following figures, a system design according to the invention will be described in detail.

The shown system comprises a number of storage racks 1,2,3,4,5, and 6, each comprising a number of storage locations (not shown). The organization will be described in detail with reference to the following figures.

A number of picking employees pick the desired products on the basis of an order list submitted by a principal and gather these together in one total order from a specific principal. Each truck 15,16,17 is then loaded with one order or a combination of orders from various principals.

In consideration of the truck's route, the loading of the truck must be controlled carefully so that each individual order is loaded in an order which makes it easy to subsequently check the order on a list and unload the order at a particular stop on the truck route.

The individual product numbers of each order should thus ideally be under complete control from beginning to end, i.e. from the time at which the contents of an order list are picked from the storage racks 1,2,3,4,5, and 6 to the time when the goods are delivered to the principal.

The invention, which will be described at a later point, can be implemented at several levels or in several versions of the shown system. Initially, however, we will start by describing the basic and principal functions of the system.

Based on the relatively simple and uncomplicated system described above, it will be easy to understand that the general control of the process may easily be quite complicated and immense, even with relatively few stock numbers. This complexity is not improved when the number of products in a typical distribution warehouse usually exceeds 70,000 product numbers and when the number of picking employees may be around 40.

In its conventional embodiment, the shown system, which operates on the basis of a combination of man power and a certain degree of automatization, will have a builtin logistic weakness as central control during the entire process is impossible or at least quite expensive according to prior art. Hardware costs will increase proportionately with a large range of products.

In addition, the above-mentioned conventional system will rely on the actions and self-initiated activities of the individual employees not subjected to any control, just as the flexibility of the manual activities for the different work processes will be significantly limited.

Figure 2:
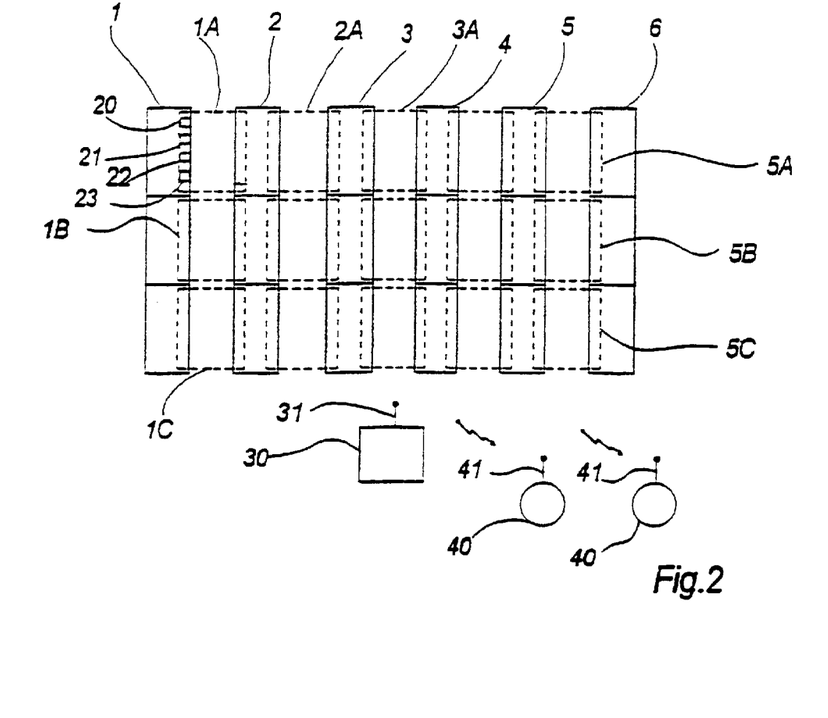
FIG. 2 shows an implemented system according to the invention in a warehouse shown in FIG. 1.

FIG. 2 shows a detailed description of the above-mentioned system, wherein an embodiment of the invention has been implemented. The figure shows a quite detailed section of the warehouse storage racks 1–6.

The shown storage racks feature a number of elementary zones 20,21,22,23, among other things, of which only a section has been shown in order to maintain the overall impression of the figure. In the shown situation, the elementary zones will consist of shelves or drawers that have been assigned a particular product number each.

In relation to FIG. 1, the figure also comprises a central control unit 30 which is a stationary computer unit according to the shown embodiment. The control unit is wirelessly connected to a number of mobile communication units 40 via an antenna 31 or an arrangement with a corresponding functionality, the communication units also being provided with devices for wireless receipt and transmission of the communication signals.

From an electrical point of view, the depicted wireless communication is implemented in accordance with known principles in such a manner that wireless communication to and from the mobile communication units is two-way: location signals are transmitted to the mobile units 40 and return signals are transmitted from the mobile units 40 back to the central control unit 30.

According to the shown embodiment, the storage racks 1–6 have been further sub-divided into a number of appropriately dimensioned macro zones fitting the purpose 1A, 1B, 1C, 2A, . . . , 3A, . . . , 5A, 5B and 5C.

According to the shown embodiment, each macro zone is designed for communication with the central control unit 30 by wireless or fixed wiring in one-way or multidirectional communication. According to the preferred embodiment, communication between the macro zones and the central control unit is wireless.

Each location action is initiated in accordance with the shown example from the central control unit 30 communicating wirelessly with a location signal to the mobile communication unit 40, whereby the warehouse employee receives a location signal which is an instruction to move to e.g. macro zone 1A. This instruction may be supported by a graphic illustration on the display of the mobile communication unit 40.

Once the warehouse employee has arrived at the macro zone, he believes to be the correct one, he may use the mobile unit with a built-in bar code scanner to scan any elementary zone identification number which may be a label at each shelf location, just as he may read a product number which is subsequently transmitted wirelessly to the central unit 30. Once the central unit 30 has received this code, it will be able to determine whether the warehouse employee is at the right macro zone on the basis of the stored information of the elementary zone or the location of the product number.

If it is the correct macro zone, the central control unit will subsequently open the macro zone and visually indicate the exact desired location position to the warehouse employee.

If the warehouse employee has not scanned in a code corresponding to the right macro zone, the central unit will generate an error signal to the employee and the macro zone remains closed. As a supplement to the error signal, the unit may possibly also generate a supplementary location-signal suggesting the path from the incorrect macro zone to the correct macro zone.

If an employee arrives at a macro zone which has already been opened by another employee, the central unit 30 will ensure that the current action in the macro zone will be completed before the macro zone may be reopened. This situation may also be supplemented by oral information to the warehouse employee.

Thus, the warehouse employee will be able to quickly locate a particular macro zone and obtain quick and comprehensible identification of the storage position addressed by the location action upon arrival.

Finally, by means of the mobile unit 40, the warehouse employee may transmit a return signal back to the central unit 30 containing information of whether the action has been partly of wholly completed, upon which the central unit 30 may register this information and initiate a new location action.

The return signal transmitted back to the central unit may e.g. contain information of the number of picked products. In case the storage position does not comprise the desired number of products, the central control unit will receive this information and guide the warehouse employee to another storage position comprising a corresponding product or register the lack of that product on an inventory list to be used in connection with the purchase of new products.

Figure 3:
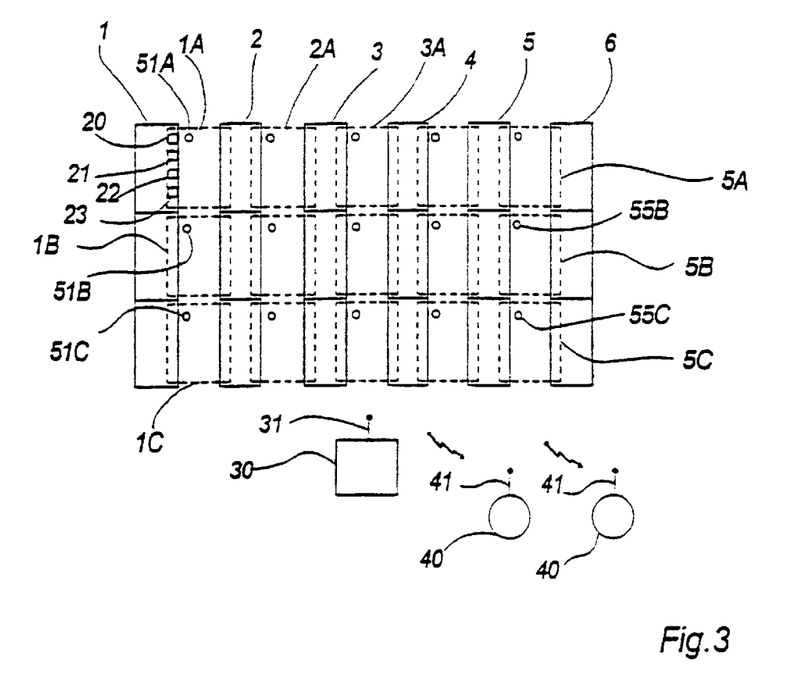
FIG. 3 shows a modified system of a system according to the invention shown in FIG. 2.

Another way of implementing macro zone communication has been shown in FIG. 3 where direct communication between the central control unit 30 and the macro zones 1A to 5C is reduced to only taking place with the control unit 30 through the mobile units. This can be done by addressing the macro zones 1A to 5C indirectly by the central control unit by providing the mobile unit with e.g. a known bar code scanner and each macro zone with bar code scanning terminals 51B, 51C, 55B and 55C. Again, the number of shown terminals is reduced for illustrative purposes.

The functionality of the system may e.g. also be illustrated by a warehouse employee carrying a mobile unit 40 being provided with visual or oral instructions represented by a first location signal instructing the employee to move to e.g. macro zone 1C.

Upon arrival at macro zone 1C, the warehouse employee "opens" it by moving to terminal 51C. During scanning, the mobile unit 40 will register that the employee has carried out the instructions provided by the first location signal and transmit this information back to the central control unit 30. Upon or prior to arrival, the mobile unit has received instructions form the central control unit which is registered when macro zone 1C is opened whereupon the elementary zone is visually activated. The visual activation represented by e.g. shelf-mounted light-emitting diodes (LEDs) or corresponding technical equivalents such as controllable laser pointers mean that the warehouse employee receives a direct, simple and clear indication of the specific and targeted storage location or elementary zone for the location action in progress without the use of lists or similar tools.

The warehouse employee may subsequently receive various kinds of indications of the number to be picked from the individual items in the targeted elementary zone. This information may e.g. be provided by a dummy display in each elementary zone which is activated once the zone is addressed.

When the location action has been completed, either by picking the correct number of items or by the warehouse employee determining that the storage location, or the elementary zone, does not comprise the desired number of items, this information may be returned to the central control unit 30 by e.g. the warehouse employee closing the macro zone at terminal 51C in such a manner that the identification of the elementary zone in the macro zone is disconnected whereby the macro zone will be ready for opening by another warehouse employee, just as a new location action may be activated centrally.

Figure 4:
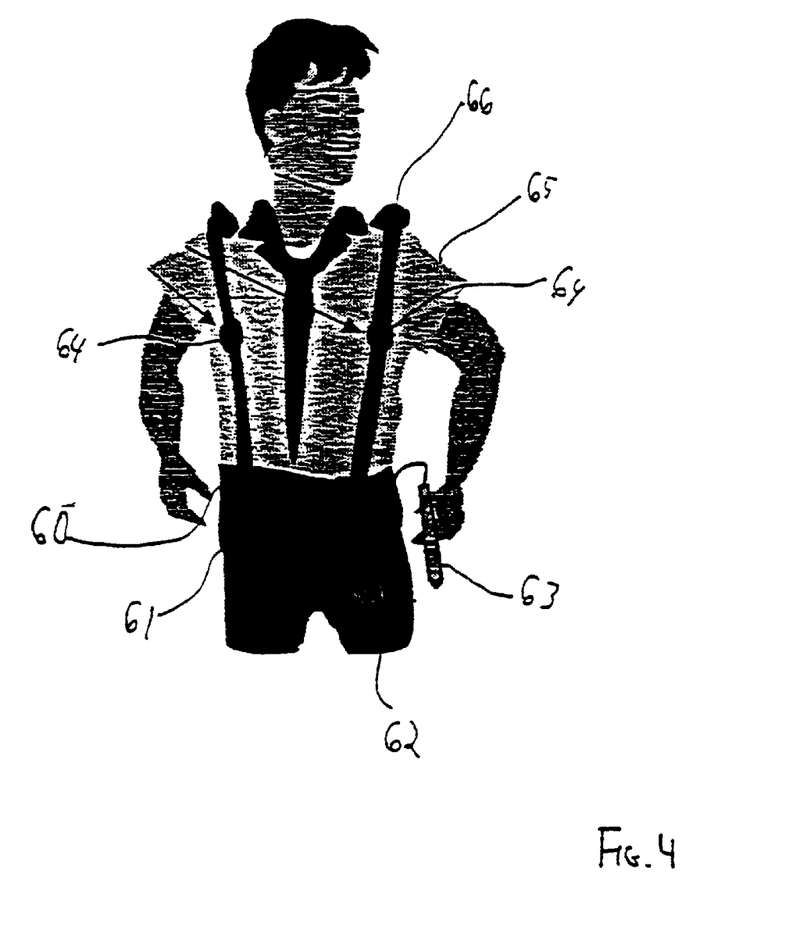
FIG. 4 shows an example of a mobile unit according to the invention.

FIG. 4 shows an example of an embodiment of a mobile communication unit 6 according to the invention.

FIG. 4 shows a warehouse employee 65 carrying a mobile communication unit 6 comprising a personal module 62 and a bar code pen 63 connected thereto. The personal module 62 is also connected to signing buttons 64 and speakers 66. Finally, the mobile unit comprises a battery holder 61 wherein a battery is connected to the personal module 62 upon insertion.

In the shown example, the antenna of the mobile unit (not shown) is located in the lapel of the vest. Other locations of the antenna are naturally also possible.

A significant feature of a mobile unit according to the invention is that it comprises a vest which has been balanced in relation to the components incorporated in the vest. In particular, it should be noted that the relatively heavy battery has been placed symmetrically with the weight of the personal module.

It should also be noted that the routine operations of the mobile unit may be carried out by means of the two signing buttons 64 placed ergonomically correct. When not being operated, the unit is hand-free.

This ergonomically correct design is particularly advantageous as a warehouse employee must use it for long periods of time making it of great importance that the body burden is reduced to an absolute minimum.

In another embodiment, the mobile communication unit has been mounted onto a picking trolley or a fork lift. In that manner, the warehouse employee has his hands free without having to carry a vest.

The personal module has been designed for receipt and transmission of wireless signals from the central control unit 30, see FIGS. 2 and 3. The mobile communication unit is addressed unambiguously.

The functionality of a preferred mobile communication unit 60 according to the invention includes a bar code pen 63 to be used by the warehouse employee once he has arrived at the macro zone upon receipt of "oral" instructions from the central control unit of the macro zone towards which the employee 65 must go. The "oral" instructions may e.g. be supplemented by a visual indication on the personal module 62. Oral instructions are preferably generated by a speech chip in the personal module 62 and rendered in the speakers 64, whereby the necessary transmitted wireless communication between the mobile unit 60 and the central control unit is kept at a minimum. This may e.g. reduce communication between the central control unit and the mobile unit 60 to fairly simple coded communication with a limited number of required codes. The personal module 62 is also designed to transmit the recorded data from the bar code pen 63 to the central control unit, whereby the central control unit has registered that the warehouse employee 65 is now ready to receive further instructions. The warehouse employee may subsequently receive "oral" instructions of the location of the macro zone at which the sought elementary zone is located. If the warehouse employee has been sent to a particular macro zone with the purpose of picking products therefrom, the number of products to be picked may e.g. be displayed on the display of the personal module 62 or maybe provided as oral instructions on the basis of the central control unit while filling of the storage position, i.e. the elementary zone, does not require anything besides identification of the elementary zone. On the basis of a signal from the central unit, identification of the elementary zone may take place by oral instructions in the speakers of the mobile unit 60 but may usually be indicated visually by a device consisting of shelf-mounted light-emitting diodes (LEDs) or a laser pointer, both of which are controlled by the central unit. These visual indication units will be described in detail in the following figures.

Depending on the application, the bar code pen 63 is designed to scan the bar code identification numbers of the macro zones in such a manner that the mobile unit 60 may transmit a sign to the central unit upon scanning of the macro zone identification number informing the central unit that the correct macro zone has been located and that the warehouse employee 65 is now ready to receive an elementary zone identification number. Alternatively, if the warehouse employee has arrived at the wrong macro zone, the central unit will send an error signal to the warehouse employee and not provide him with an elementary zone identification number until the correct macro zone has been scanned by the bar code pen 63.

Figure 5:
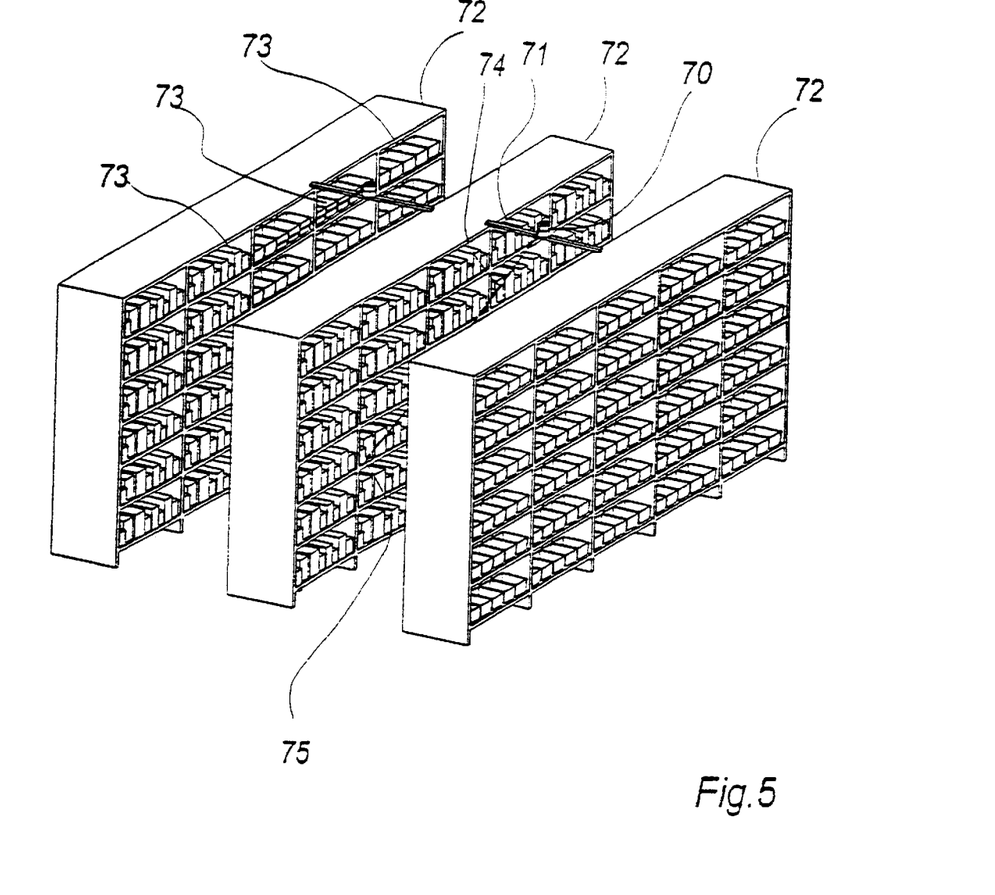
FIG. 5 shows an example of an indication system comprising a laser pointer.

FIG. 5 shows an example of a centrally controlled visual indication device according to the invention and consists of a laser pointer 70 mounted in each macro zone. The number of laser pointers 70 to be mounted in each macro zone depends on the size and location of the macro zone. The laser pointer 70 is mounted on a mounting lever 71 which is mounted onto a storage rack 72 at each end. The laser pointer 70 is mounted in such a manner that it may point to all storage locations, i.e. elementary zones 73 of the individual macro zone, by means of a light beam 74. In the shown example, the light beam 74 is pointing to an elementary zone 75 so that the warehouse employee has the correct elementary zone pointed out to him upon arrival at the macro zone.

The laser pointer 70 is controlled centrally by the central unit and will typically be activated immediately after a warehouse employee has been instructed by the central unit to move to a certain macro zone.

The laser pointer 70 will thus comprise a number of movement units that will point to the elementary zone defined by the central control unit by moving the laser light provider itself or by a controlled reflection of the light beam.

A significant advantage to be obtained by using one or more laser pointers to visualize the macro zones is that a laser pointer is quite simple to mount and calibrate while also being quite inexpensive to manufacture. Laser pointers may thus be calibrated individually and thereby be adapted to each macro zone and the contents of the elementary zones by means of e.g. a joy-stick which may control the laser pointer trough the central unit and point it at the desired storage positions whereupon the central unit may register the position coordinates of the laser pointer and associate them with the desired elementary zone.

Changes in the definitions of elementary zones will thus not require new hardware.

If the macro zones are arranged in a fairly (logical) manner, a warehouse employee will be able to locate a particular macro zone in only a minimum amount of time, locate the desired elementary zone and subsequently carry out the necessary picking of the items.

Figure 6:
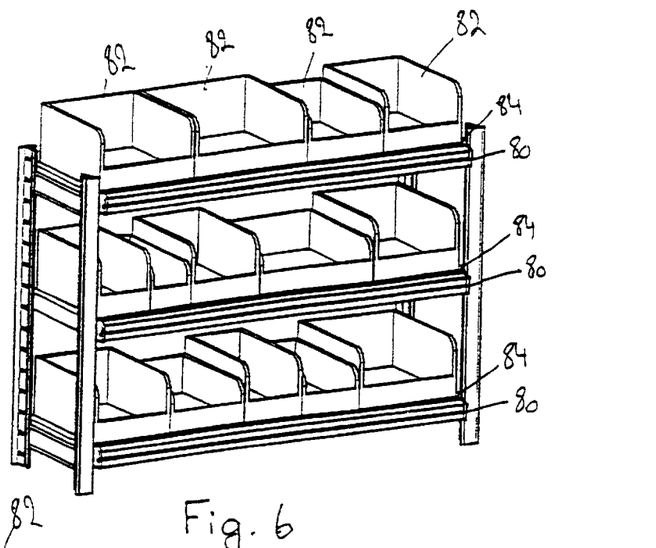
FIG. 6 shows yet another and advantageous embodiment of the visual, centrally controlled indication units.

FIG. (6) shows another advantageous embodiment of visually and centrally controlled indication units.

In the shown example, the units comprise shelf-mounted light-emitting diodes (LEDs) that may point out specific elementary zones 81 centrally by appropriate calibration of the central control unit.

FIG. 6 shows a particularly advantageous embodiment of the indication system represented by indication rails 80.

In the shown embodiment, the indication rails 80 are mounted at the front edge of a shelf 84. Each indication rail 80 is provided with a number of indicators (not shown) that may be LEDs in accordance with a particular embodiment.

Furthermore, a control unit (not shown) incorporated in the indication rail 80 may activate the individual indicators upon a control signal provided by the central control unit. In a particular embodiment, the control signal may be provided by either the central control unit or the mobile unit.

If the indication rails 80 have been appropriately calibrated, the individual indicators may be brought to point to an elementary zone 82 represented by e.g. one or more item boxes/containers as shown in the figure, where the connection between the indicator and the elementary zone 82 is defined by the central control unit.

Figure 7:
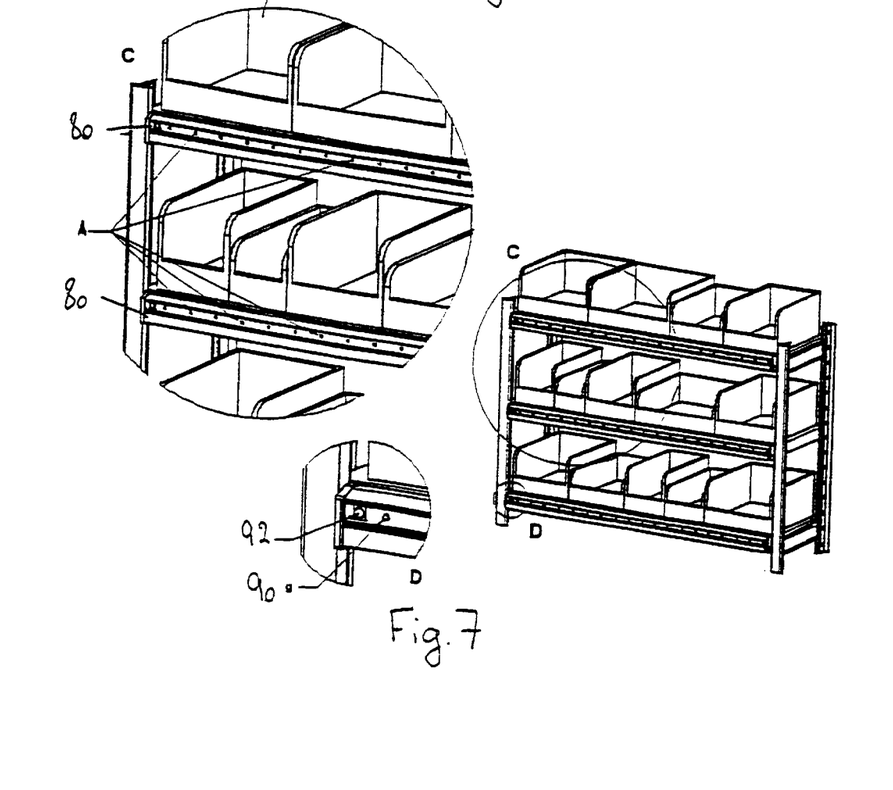
FIG. 7 shows a close-up of the indication system mounted onto shelves 84.

FIG. 7 shows a close-up of the indication system mounted upon shelves 84. Close-ups have been made of two areas of figures C and D, the areas being described in detail in the following.

C shows a section of the indication rails 80 in which the indicators 90 are apparent. It can be seen that the elementary zones 82 vary in size which is the reason why it would be appropriate to assign indicator 90 placed centrally under e.g. elementary zone 82 to elementary zone 82.

D shows the corner of an indication rail 80 which illustrates an indicator 90 and a control unit 92. The control unit 92 is connected to the indicators 90 and may activate any given indicator 90 through control signals provided by the central unit. The control unit is connected to the central unit in a network. In one embodiment, the system is constructed as a self-configurating network such as e.g. LonWorks, whereby new rails may be quickly integrated in the system. Once a new rail is connected to the system, the control unit of that rail reports its presence to the central unit which provides the control unit with an identification code making the rail part of the system. This means that the system adopts easily to expansion while also being equally easy to restructure.

The programming of the rails may take place by choosing an indicator by means of a control signal to the control unit. The chosen indicator may then be assigned to an elementary zone 82 and thereby to the item present in elementary zone 82. This assignment is stored in the central unit in terms of e.g. a list assigning an indicator ID, elementary zone ID and a product number to each other.

In the figure, A shows the indicators placed centrally under the individual elementary zones 82. In case the elementary zones are moved around or e.g. change size, a new indicator may be assigned to elementary zone 82. In this manner, it is always possible to assign the indicator which is centrally placed in relation to the appropriate elementary zone. The result of this is that the indicator list may identify elementary zones irrespective of the width of these.

Figure 8:
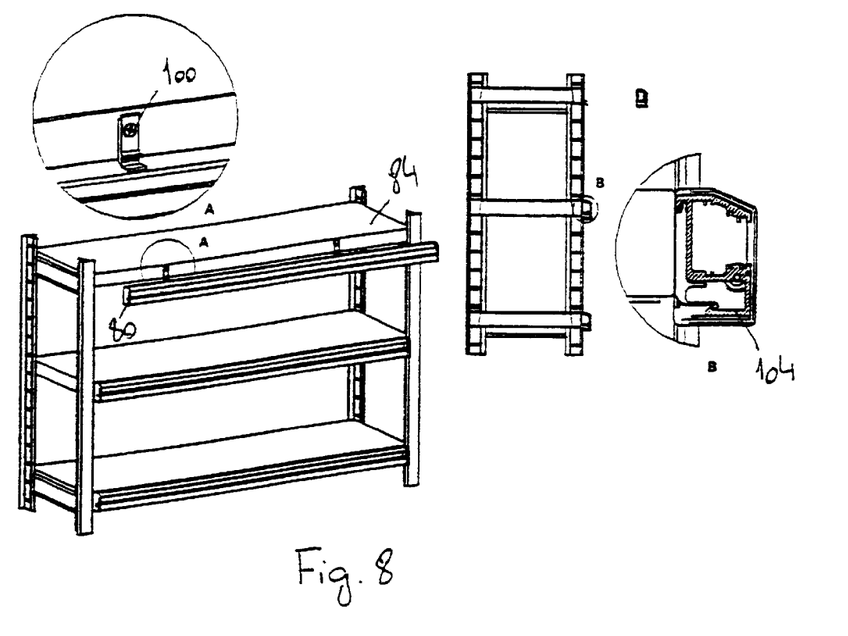
FIG. 8 shows a preferred mounting principle of the indication rails 80 onto a shelf 84 according to the invention.

FIG. 8 shows a preferred method of mounting of the indication rails 80 onto a shelf 84 according to the invention. A fixation device 100 is mounted onto the shelf 84 illustrated by section A. The rail 80 may subsequently be mounted onto the shelf 84 by means of a snap catch 104 illustrated by section B in FIG. 8. If this snap catch is applied, the rail is fairly easy to mount and dismount from the shelf, whereby a system has been created which is easy to expand while at the same time allowing easy replacement in case one of the bars is defect.

What is claimed is:

1. System for handling of items constituting a range of items, said system comprising:
    at least one central control unit;
    at least one mobile communication unit designed to generate audio and/or visual location signals on the basis of wireless communication signals generated by the central control unit; and
    at least one return signal path between the communication unit and the central control unit,
    wherein the items are located in macro zones with at least one underlying hierarchy of elementary zones, each macro zone comprises one visual indication system directly or indirectly controlled by the central control unit on the basis of a current location action, and the system is designed to open a macro zone in response to a macro zone location signal.

2. System according to claim 1 wherein the central control unit is designed to store digitally stored handling lists comprising a number of standardized actions and the central control unit comprises means for transmission of a signal to initiate a standardized action to one or more specifically addressed communication units on the basis of the handling list stored in the central control unit.

3. System according to claim 1 wherein the system is wholly or partially activated by the central control unit by transmission of a signal of initiation of a location action.

4. System according to claim 1 wherein the mobile communication unit comprises a code scanner for scanning of item and/or elementary zone numbers and the system is designed to open a macro zone on the basis of the central control unit upon receipt of a macro zone location signal by the mobile communication unit from the central control unit when a code has been scanned by the scanner, said code corresponding to the macro zone location signal of the elementary zone or item.

5. System according to claim 1 wherein the system is designed for wholly or partially automatic transmission of a new signal to initiate a location action upon receipt of a return signal by an operator.

6. System according to claim 5 wherein the mobile communication unit is designed to transmit the return signals activated by the operator.

7. System according to claim 5 wherein the signal initiates a location action comprising or generating instructions to the operator or to the mobile communication units identifying a macro zone where one or more items must be located.

8. System according to claim 1 further comprising at least one laser pointer for each macro zone, said laser pointer being arranged in such a manner that it may point to the relevant elementary zones of the macro zone on the basis of control signals provided by the central control unit.

9. System according to claim 8 further comprising stationary display units for indication of at least one elementary zone.

10. System according to claim 1 wherein the mobile communication unit comprises:
    a means for receipt and transmission of wireless communication signals;
    a means for generation of audio signals and/or visual signals on the basis of received signals in order to initiate a location action from a central unit; and
    a device for manual activation of a wireless return signal to the central control unit,
    said return signal indicating that a location action is completed, said communication unit being designed for generating a macro zone locating signal, and said audio signals and/or visual signals being able to identify part of or all macro zones to an operator carrying the communication unit.

11. System according to claim 10 wherein the mobile communication unit further comprises a display unit for displaying a macro zone, wherein identification of an item and information of number and/or quantity of items are picked or distributed.

12. System according to claim 1, wherein the visual indication system comprises a number of markers and a control unit, said control unit comprising a communication means for receipt and transmission of control signals, and said control unit comprising an activation means for activation of the markers, wherein the markers and the control unit are incorporated in an indication unit of the visual indication system.

13. System according to claim 12 wherein one or more elementary zones are adjustably controlled by the control unit.

14. System according to claim 12 wherein the markers are located in such a manner that they may identify elementary zones with a predetermined width.

15. System according to claim 12 wherein the markers are light-emitting diodes (LEDs).

16. System according to claim 12 wherein the communication means of the control unit is able to communicate wirelessly.

17. System according to claim 12 wherein the indication unit is shaped as a rail.

18. System according to claim 17 wherein a length of the rail corresponds to a length of at least one shelf in a rack.

19. System according to claim 17 wherein the markers are uniformly dispersed along the rail.

* * * * *